(12) United States Patent
Ohwa (10) Patent No.: US 7,870,137 B2
(45) Date of Patent: Jan. 11, 2011

(54) INFORMATION PROCESSING APPARATUS, INFORMATION PROCESSING METHOD, AND PROGRAM

(75) Inventor: Tsunayuki Ohwa, Kanagawa (JP)

(73) Assignee: Sony Corporation (JP)

(*) Notice: Subject to any disclaimer, the term of this patent is extended or adjusted under 35 U.S.C. 154(b) by 394 days.

(21) Appl. No.: 12/214,402

(22) Filed: Jun. 18, 2008

(65) Prior Publication Data
US 2008/0320039 A1  Dec. 25, 2008

(30) Foreign Application Priority Data
Jun. 19, 2007 (JP) ............................ P2007-161533

(51) Int. Cl.
*G06F 17/30* (2006.01)
(52) U.S. Cl. ...................... 707/737; 707/752
(58) Field of Classification Search .................. 707/736, 707/737
See application file for complete search history.

(56) References Cited

U.S. PATENT DOCUMENTS

| 2003/0072486 | A1 | 4/2003 | Loui et al. |
| 2005/0165841 | A1 | 7/2005 | Kasperkiewicz et al. |

FOREIGN PATENT DOCUMENTS

| EP | 1589444 | 10/2005 |
| JP | 10-143631 A | 5/1998 |
| WO | 2006098490 | 9/2006 |

OTHER PUBLICATIONS

Loui A C et al: "Automatic image event segmentation and quality screening for albuming applications"Multimedia and Expo, 2000. ICME 2000. 2000 IEEE International Conferen Ce on New York, NY, USA Jul. 30-Aug. 2, 2000, Piscataway, NJ, USA,IEEE, US, vol. 2, Jul. 30, 2000, pp. 1125-1128.

Platt J C et al: "PhotoTOC: automatic clustering for browsing personal photographs" Information, Communications and Signal Processing, 2003 and Fourth PAC IFIC Rim Conference on Multimedia. Proceedings of the 2003 Joint Confe Rence of the Fourth International Conference on Singapore Dec. 15-18, 2003, Piscataway, NJ, USA, vol. 1, Dec. 15, 2003 pp. 6-10.

(Continued)

*Primary Examiner*—Charles Rones
*Assistant Examiner*—Belix M Ortiz
(74) *Attorney, Agent, or Firm*—Lerner, David, Littenberg, Krumholz & Mentlik, LLP (57) ABSTRACT

An information processing apparatus for grouping plural contents into clusters, the apparatus includes: an acquisition portion configured to acquire metadata of each of the plurality of contents; and a clustering portion configured to group the plural contents into the clusters based on the metadata, such that each of the clusters has N or less contents, N being a predetermined number. The clustering portion calculates a distance d(n) according to a predetermined distance scale between an nth content and an (n+1)th content with respect to first N+1 contents in a content sequence, and determines a greatest distance d(k), groups first k contents in the content sequence into one cluster, and with a (k+1)th content in the content sequence as a new top content in the content sequence, repeats the determining of the greatest distance d(k) and the grouping of the first k contents in the content sequence into one cluster.

7 Claims, 6 Drawing Sheets

OTHER PUBLICATIONS

Anan H et al: "Efficient Discovery Service for a Digital Library of 3D Model s" 3-D Digital Imaging and Modeling, 2005.3DIM 2005. Fifth International Conference on Ottawa, ON, Canada Jun. 13-16, 2005, Piscataway, NJ, USA,IEEE, Jun. 13, 2005, pp. 492-498.

O'Callaghan et al: "MPEG Visual-Temporal Clustering for Digital Image Collections" Information Retrieval Technology Lecture Notes in Computer Science;;LNCS, Springer-Verlag, BE, vol. 3689, Jan. 1, 2005, pp. 339-350.

European Search Report, EP 08 15 8542.

INFORMATION PROCESSING APPARATUS, INFORMATION PROCESSING METHOD, AND PROGRAM

CROSS-REFERENCE TO RELATED APPLICATIONS

The present application claims priority from Japanese Patent Application No. JP 2007-161533, filed in the Japanese Patent Office on Jun. 19, 2007, the entire content of which is incorporated herein by reference.

BACKGROUND OF THE INVENTION

1. Field of the Invention

The present invention relates to an information processing apparatus, an information processing method, and a program. In particular, the present invention relates to an information processing apparatus, an information processing method, and a program which make it possible to group contents, such as data of images taken with a digital camera, into clusters such that each of the clusters will have an appropriate number of contents.

2. Description of the Related Art

In the case of digital cameras, for example, digital image data (hereinafter referred to as "photograph data" as appropriate) obtained by photographing a subject is recorded together with metadata that includes a date/time at which a photograph of the photograph data was taken (hereinafter referred to as a "photographing date/time" as appropriate), and so on.

As a result of the spread of the digital cameras, various management applications used for managing the photograph data on a computer have been provided (i.e., placed on the market). In some of the management applications, for example, pieces of photograph data that were obtained on the same date are grouped into one cluster, based on the photographing date/time included in the metadata.

In the case of photographs taken with a silver halide camera, a user commonly classifies the photographs according to photographing date/time, photographing location (photographing place), event, or the like, and arrange photographs taken on the same date, photographs taken at the same photographing place, photographs taken at the same event, or the like on one page or consecutive pages of an album, thereby organizing the photographs.

There are management applications used for organizing pieces of photograph data using an electronic album (hereinafter referred to as a "scrapbook" as appropriate) that simulates a physical album that is used to organize actual photographs.

An image file system has been proposed in Japanese Patent Laid-open No. Hei 10-143631, for example. According to this image file system, film-based images taken are converted into electronic images, additional information such as the date and place of photography is added to the electronic images, and they are stored and managed as electronic data. Meanwhile, a photographic film on which the images are recorded is kept so as to be associated with the electronic data, and the electronic data is made available for delivery to a location that needs the electronic data. In response to a request from a user who owns the electronic images, the image file system makes copies of requested images from the photographic film corresponding to the electronic images.

SUMMARY OF THE INVENTION

When organizing the pieces of photograph data using the scrapbook, the user can specify positions in the scrapbook at which the respective pieces of photograph data should be placed. In this manner, the user is able to place pieces of photograph data of the same photographing date, pieces of photograph data of the same photographing place, or pieces of photograph data of the same event on one page or consecutive pages of the scrapbook, for example.

However, it is cumbersome for the user to specify the positions in the scrapbook at which the respective pieces of photograph data should be placed, when the number of pieces of photograph data is very large.

As such, for example, as described above, a method is conceivable of grouping the pieces of photograph data obtained on the same date into one cluster based on the photographing date/time included in the metadata, and placing the pieces of photograph data that belong to the same cluster on the same page of the scrapbook, thereby organizing the pieces of photograph data.

However, in the case where only a limited number of pieces of photograph data can be placed on one page of the scrapbook, all pieces of photograph data that belong to the same cluster cannot be placed on one page if the number of pieces of photograph data that belong to that cluster is greater than a maximum number of pieces of photograph data that can be placed on one page (this maximum number will be hereinafter referred to as a "maximum photograph number" as appropriate).

In that case, of the pieces of photograph data that belong to the cluster as arranged in the order of the photographing date/time, for example, the first to Nth pieces of photograph data (where N is the maximum photograph number) are placed in one page, while the remaining pieces of photograph data are placed in a next page, for example.

Suppose, for example, that the maximum photograph number is N, and that the number of pieces of photograph data that belong to the cluster is N+1, which is greater than the maximum photograph number N by one. In this case, the N+1 pieces of photograph data belonging to this cluster is divided into two groups, one composed of the first N pieces of photograph data and the other composed of the remaining piece of photograph data that has the latest photographing date/time, for example, and the N pieces of photograph data are placed on one page while the one piece of photograph data is placed on the next page.

Suppose here that there is a long time interval between the photographing date/time of the (N−1)th piece of photograph data and the photographing date/time of the Nth piece of photograph data, whereas there is a short time interval between the photographing date/time of the Nth piece of photograph data and the photographing date/time of the (N+1)th piece of photograph data. In this case, it is preferable that the Nth piece of photograph data and the (N+1)th piece of photograph data be placed on the same page, because the photographing date/times of these two pieces of photograph data has a short time interval therebetween.

The present invention addresses the above-identified, and other problems associated with existing methods and apparatuses, and makes it possible to group contents, such as the pieces of photograph data, into clusters such that each of the clusters will have an appropriate number of contents.

According to one embodiment of the present invention, there is provided an information processing apparatus for grouping a plurality of contents into clusters, the apparatus including: an acquisition portion configured to acquire metadata of each of the plurality of contents; and a clustering portion configured to group the plurality of contents into the clusters based on the metadata, such that each of the clusters has N or less contents, N being a predetermined number. The clustering portion calculates a distance $d(n)$ according to a predetermined distance scale between an nth content and an (n+1)th content with respect to first N+1 contents in a content sequence, and determines a greatest distance $d(k)$ of all the distances $d(n)$, the content sequence being a sequence of the plurality of contents as arranged according to a predetermined standard based on the metadata. The clustering portion also groups first k contents in the content sequence into one cluster; and with a (k+1)th content in the content sequence as a new top content in the content sequence, repeats the determining of the greatest distance $d(k)$ and the grouping of the first k contents in the content sequence into one cluster.

According to another embodiment of the present invention, there is provided an information processing method for grouping a plurality of contents into clusters, the method including the steps of: acquiring metadata of each of the plurality of contents; and grouping the plurality of contents into the clusters based on the metadata, such that each of the clusters has N or less contents, N being a predetermined number. The grouping step includes: calculating a distance $d(n)$ according to a predetermined distance scale between an nth content and an (n+1)th content with respect to first N+1 contents in a content sequence, and determining a greatest distance $d(k)$ of all the distances $d(n)$, the content sequence being a sequence of the plurality of contents as arranged according to a predetermined standard based on the metadata. The grouping step further includes: grouping first k contents in the content sequence into one cluster; and with a (k+1)th content in the content sequence as a new top content in the content sequence, repeating the determining of the greatest distance $d(k)$ and the grouping of the first k contents in the content sequence into one cluster.

According to yet another embodiment of the present invention, there is provided a program for causing a computer to function as an information processing apparatus for grouping a plurality of contents into clusters, the program causing the computer to function as: an acquisition portion configured to acquire metadata of each of the plurality of contents; and a clustering portion configured to group the plurality of contents into the clusters based on the metadata, such that each of the clusters has N or less contents, N being a predetermined number. The clustering portion calculates a distance $d(n)$ according to a predetermined distance scale between an nth content and an (n+1)th content with respect to first N+1 contents in a content sequence, and determines a greatest distance $d(k)$ of all the distances $d(n)$, the content sequence being a sequence of the plurality of contents as arranged according to a predetermined standard based on the metadata. The clustering portion also groups first k contents in the content sequence into one cluster; and with a (k+1)th content in the content sequence as a new top content in the content sequence, repeats the determining of the greatest distance $d(k)$ and the grouping of the first k contents in the content sequence into one cluster.

According to the above-described embodiments of the present invention, the metadata of each of the plurality of contents is acquired, and based on the metadata, the plurality of contents are grouped into the clusters, each of which has N or less contents, N being the predetermined number. In the grouping of the plurality of contents into the clusters, the distance $d(n)$ according to the predetermined distance scale between the nth content and the (n+1)th content is calculated with respect to the first N+1 contents in the content sequence, i.e., the sequence of the plurality of contents as arranged according to the predetermined standard based on the metadata, and the greatest distance $d(k)$ of all the distances $d(n)$ is determined. In the grouping of the plurality of contents into the clusters, the first k contents in the content sequence are grouped into one cluster; and with the (k+1)th content in the content sequence as a new top content in the content sequence, the determining of the greatest distance $d(k)$ and the grouping of the first k contents in the content sequence into one cluster are repeated.

The program may be transmitted via a transmission medium to be provided to a user. Also, the program may be stored in a storage medium to be provided to the user.

The information processing apparatus may be an independent device. Also, the information processing apparatus may be an internal block that forms part a device.

According to one embodiment of the present invention, it is possible to group contents into clusters such that each of the clusters will have an appropriate number of contents.

DETAILED DESCRIPTION OF THE PREFERRED EMBODIMENTS

Hereinafter, preferred embodiments of the present invention will be described. Correspondence between the constituent features of the present invention and the preferred embodiments that will be described in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

Figure 2:
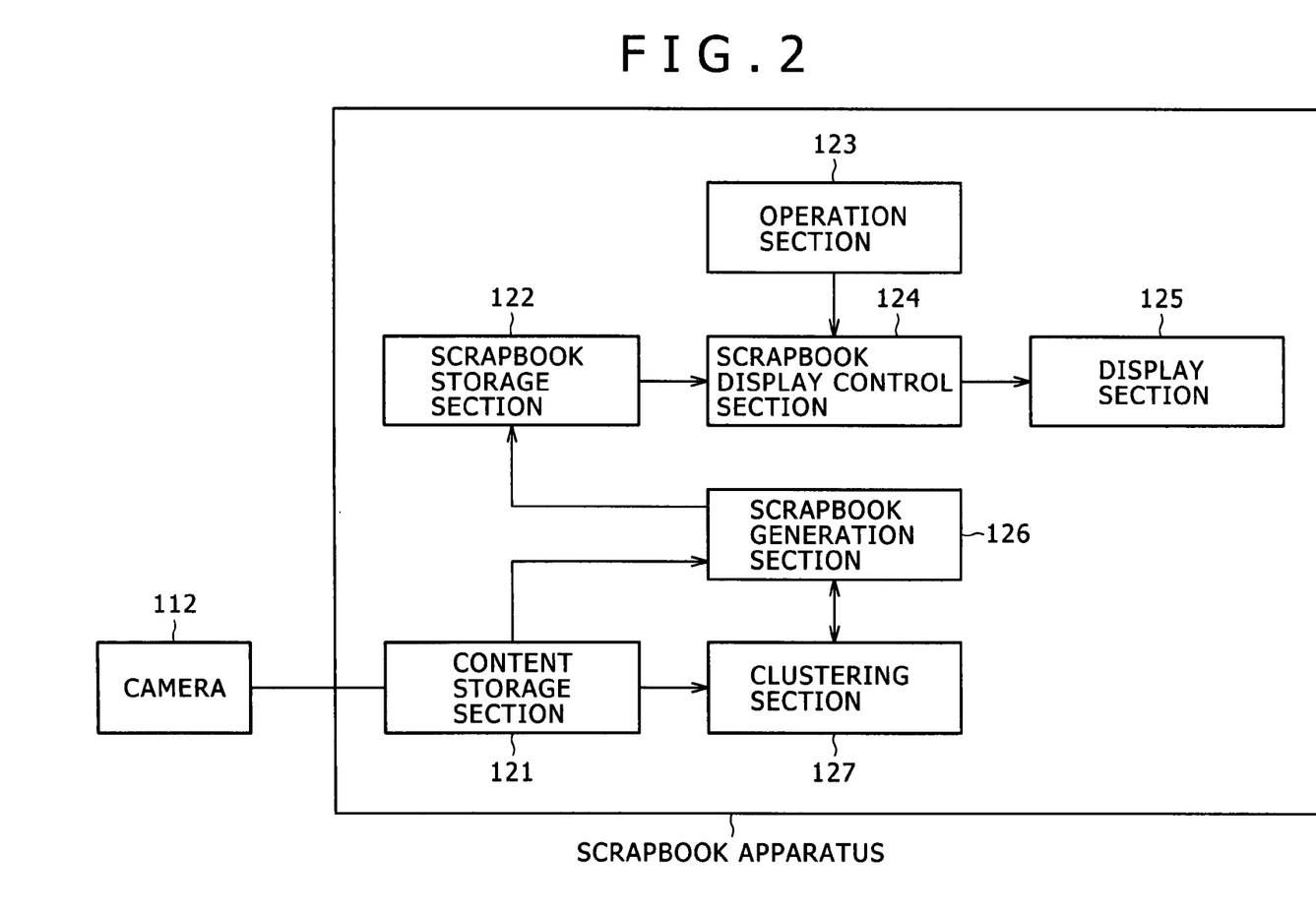
FIG. 2 is a block diagram illustrating an exemplary functional structure of a scrapbook apparatus.
Figure 6:
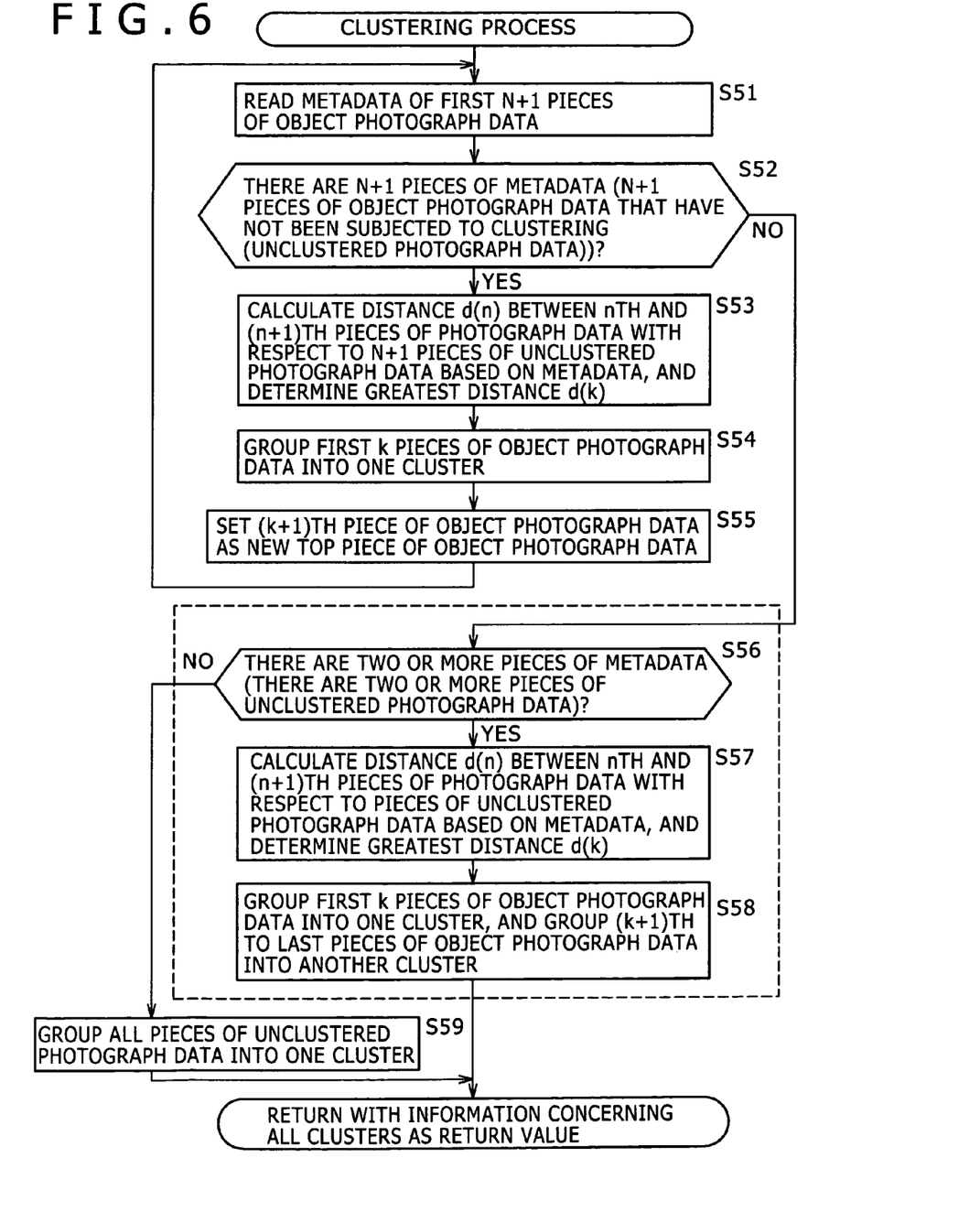
FIG. 6 is a flowchart illustrating a clustering process.

An information processing apparatus according to one embodiment of the present invention is an information processing apparatus (e.g., a scrapbook apparatus as shown in FIG. 2) for grouping a plurality of contents into clusters, the apparatus including: an acquisition portion (e.g., a clustering section 127 as shown in FIG. 2, which performs a process of step S51 as shown in FIG. 6) configured to acquire metadata of each of the plurality of contents; and a clustering portion (e.g., the clustering section 127 as shown in FIG. 2, which performs processes of steps S52, S53, S54, and S55 as shown in FIG. 6) configured to group the plurality of contents into the clusters based on the metadata, such that each of the clusters has N or less contents, N being a predetermined number, wherein the clustering portion calculates a distance d(n) according to a predetermined distance scale between an nth content and an (n+1)th content with respect to first N+1 contents in a content sequence, and determines a greatest distance d(k) of all the distances d(n), the content sequence being a sequence of the plurality of contents as arranged according to a predetermined standard based on the metadata (e.g., step S53 as shown in FIG. 6), groups first k contents in the content sequence into one cluster (e.g., step S54 as shown in FIG. 6), and with a (k+1)th content in the content sequence as a new top content in the content sequence, repeats the determining of the greatest distance d(k) and the grouping of the first k contents in the content sequence into one cluster.

The information processing apparatus according to one embodiment of the present invention may further include a scrapbook generation portion (e.g., a scrapbook generation section 126 as shown in FIG. 2) configured to generate a scrapbook with pages each of which has arranged thereon the contents belonging to a separate one of the clusters, the scrapbook being an electronic album.

The information processing apparatus according to one embodiment of the present invention may further include a scrapbook display control portion (e.g., a scrapbook display control section 124 as shown in FIG. 2) configured to allow the scrapbook to be displayed.

An information processing method according to one embodiment of the present invention is an information processing method for grouping a plurality of contents into clusters, the method including the steps of: acquiring metadata of each of the plurality of contents (e.g., step S51 as shown in FIG. 6); and grouping the plurality of contents into the clusters based on the metadata, such that each of the clusters has N or less contents, N being a predetermined number (e.g., steps S52, S53, S54, and S55 as shown in FIG. 6), wherein the grouping includes calculating a distance d(n) according to a predetermined distance scale between an nth content and an (n+1)th content with respect to first N+1 contents in a content sequence, and determining a greatest distance d(k) of all the distances d(n), the content sequence being a sequence of the plurality of contents as arranged according to a predetermined standard based on the metadata (e.g., step S53 as shown in FIG. 6), grouping first k contents in the content sequence into one cluster (e.g., step S54 as shown in FIG. 6), and with a (k+1)th content in the content sequence as a new top content in the content sequence, repeating the determining of the greatest distance d(k) and the grouping of the first k contents in the content sequence into one cluster.

Figure 1:
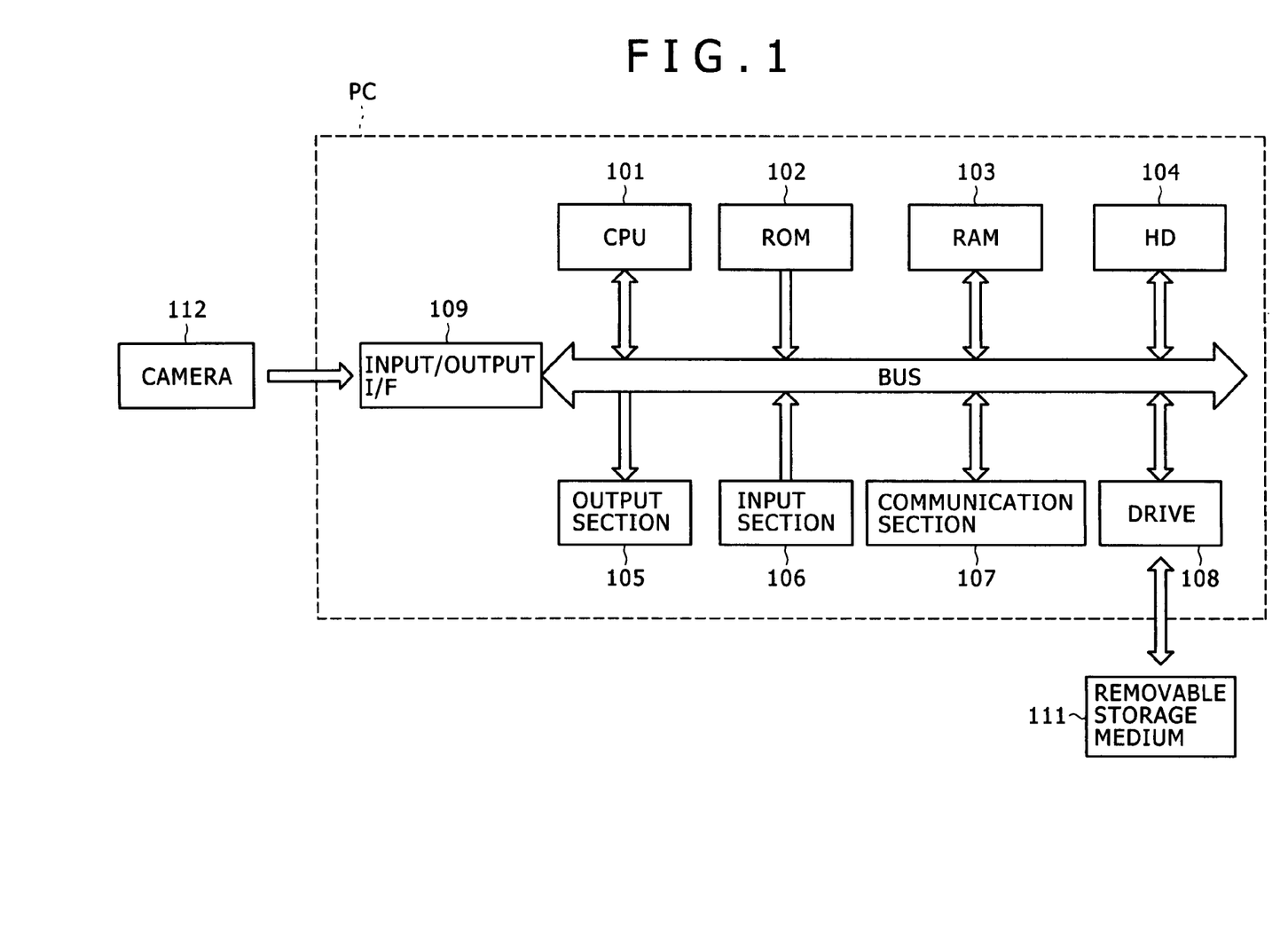
FIG. 1 is a block diagram illustrating an exemplary structure of a PC according to one embodiment of the present invention.

A program according to one embodiment of the present invention is a program for causing a computer (e.g., a PC as shown in FIG. 1) to function as an information processing apparatus (e.g., the scrapbook apparatus as shown in FIG. 2) for grouping a plurality of contents into clusters, the program causing the computer to function as: an acquisition portion (e.g., the clustering section 127 as shown in FIG. 2, which performs the process of step S51 as shown in FIG. 6) configured to acquire metadata of each of the plurality of contents; and a clustering portion (e.g., the clustering section 127 as shown in FIG. 2, which performs the processes of steps S52, S53, S54, and S55 as shown in FIG. 6) configured to group the plurality of contents into the clusters based on the metadata, such that each of the clusters has N or less contents, N being a predetermined number, wherein the clustering portion calculates a distance d(n) according to a predetermined distance scale between an nth content and an (n+1)th content with respect to first N+1 contents in a content sequence, and determines a greatest distance d(k) of all the distances d(n), the content sequence being a sequence of the plurality of contents as arranged according to a predetermined standard based on the metadata (e.g., step S53 as shown in FIG. 6), groups first k contents in the content sequence into one cluster (e.g., step S54 as shown in FIG. 6), and with a (k+1)th content in the content sequence as a new top content in the content sequence, repeats the determining of the greatest distance d(k) and the grouping of the first k contents in the content sequence into one cluster.

Hereinafter, an embodiment of the present invention will be described with reference to the accompanying drawings.

FIG. 1 is a block diagram illustrating an exemplary structure of a personal computer (PC), which is an information processing apparatus according to one embodiment of the present invention.

In FIG. 1, the PC includes a central processing unit (CPU) 101, a read only memory (ROM) 102, a random access memory (RAM) 103, a hard disk (HD) 104, an output section 105, an input section 106, a communication section 107, a drive 108, an input/output interface (I/F) 109, and a bus. The CPU 101, the ROM 102, the RAM 103, the HD 104, the output section 105, the input section 106, the communication section 107, the drive 108, and the input/output I/F 109 are connected to one another via the bus, and exchange data therebetween via the bus as necessary.

The CPU 101 executes a program stored in the ROM 102 or the RAM 103 to control each of the blocks that constitute the PC. In addition, the CPU 101 performs processes demanded to allow the PC to function as a scrapbook apparatus for organizing contents, such as pieces of photograph data, using a scrapbook, which is an electronic album.

The ROM 102 stores the program executed by the CPU 101, and so on.

The RAM 103 temporarily stores the program executed by the CPU 101, data necessary for an operation of the CPU 101, and so on.

The HD 104 stores the program executed by the CPU 101, the data necessary for the operation of the CPU 101, and so on.

The output section 105 is formed by a liquid crystal display (LCD) and a loudspeaker, for example, and displays an image and outputs sound.

The input section 106 is formed by a keyboard, a mouse, a microphone, and so on. The input section 106 is operated by a user when issuing an instruction to the PC, and so on, for example.

The communication section 107 is an interface used for communicating with a network, such as a local area network (LAN) or the Internet. The communication section 107 exchanges data or the like with the network as necessary.

A removable storage medium 111, such as a flexible disk, a CD-ROM (Compact Disc Read Only Memory), an MO (Magneto Optical) disk, a DVD (Digital Versatile Disc), a magnetic disk, or a semiconductor memory, can be attached to and detached from the drive 108. The drive 108 drives the removable storage medium 111 placed thereon to either record data or the like supplied from the bus onto the removable storage medium 111 or read the data or the like from the removable storage medium 111 and output it onto the bus.

The input/output I/F 109 is an interface used for exchanging data or the like with an external device. Examples of the input/output I/F 109 include: communication interfaces for wired communication, such as a USB (Universal Serial Bus) interface and an IEEE (Institute of Electrical and Electronics) 1394 interface; and communication interfaces for wireless communication, such as a Bluetooth (Registered) interface.

In the PC having the above-described structure, the user is able to connect a camera 112, such as a digital still camera or a digital video camera, to the input/output I/F 109, so that the photograph data, which is data of an image taken with the camera 112, can be loaded from the camera 112 to the HD 104 (so as to be stored in the HD 104) via the input/output I/F 109. The camera 112 is an exemplary external device.

In the PC as shown in FIG. 1, an application program (i.e., a scrapbook program) for allowing the PC to function as the scrapbook apparatus is installed in the HD 104, and the CPU 101 reads the scrapbook program from the HD 104, loads the scrapbook program into the RAM 103 to execute it. As a result, the PC functions as the scrapbook apparatus for organizing the contents, such as the pieces of photograph data, stored in the HD 104 using the scrapbook.

Note that the program executed by the PC (or the CPU 101 of the PC) may be originally installed in the PC (or the HD 104 of the PC), as described above. Alternatively, the program may be stored in the removable storage medium 111 first, and then installed from the removable storage medium 111 into the PC. Alternatively, the program may be downloaded from a download site on the Internet and installed into the PC.

FIG. 2 shows an exemplary structure of the scrapbook apparatus, whose functions are implemented by the CPU 101 executing the scrapbook program.

Specifically, if the user operates the input section 106 to execute the scrapbook program or if the camera 112 is connected to the input/output I/F 109 (see FIG. 1), for example, the CPU 101 executes the scrapbook program stored in the HD 104, so that the PC functions as the scrapbook apparatus as shown in FIG. 2.

In FIG. 2, the scrapbook apparatus includes a content storage section 121, a scrapbook storage section 122, an operation section 123, a scrapbook display control section 124, a display section 125, a scrapbook generation section 126, and a clustering section 127.

The content storage section 121 stores the pieces of photograph data, which are the contents loaded from the camera 112 into the PC, i.e., the scrapbook apparatus.

Here, the camera 112 takes photographs in accordance with user operations, and stores the resultant pieces of photograph data in an internal memory or a removable memory. In addition, the camera 112 stores metadata of each of the pieces of photograph data in the internal memory or the like. The metadata includes, for example, a date/time (for example, year, month, day, hour, minute, second) and location at which a photograph of the photograph data was taken. This date/time and location will be hereinafter referred to as a "photographing date/time" and a "photographing location", respectively. Further, the camera 112 is capable of outputting (sending) the photograph data and the metadata stored in the internal memory or the like to an outside.

The camera 112 contains a clock that calculates the date and time, for example, and obtains the photographing date/time, which is one component of the metadata of the photograph data, based on the date and time calculated by the clock. In addition, the camera 112 contains a reception section for receiving a signal from a GPS (Global Positioning System) satellite, for example, and obtains the photographing location, which is another component of the metadata of the photograph data, based on the signal received by the reception section.

In the scrapbook apparatus, the photograph data and the metadata loaded from the camera 112 are stored in the content storage section 121.

The metadata can be loaded from the camera 112 into the scrapbook apparatus together with the photograph data, as described above. In addition, the user is able to enter the metadata into the scrapbook apparatus by operating the input section 106. Moreover, the user is able to modify the metadata stored in the content storage section 121, by operating the input section 106, for example.

The scrapbook storage section 122 stores the scrapbook supplied from the scrapbook generation section 126.

The operation section 123 is operated by the user, and supplies an operation signal corresponding to the user operation to the scrapbook display control section 124.

In accordance with the operation signal supplied from the operation section 123 or the like, the scrapbook display control section 124 performs control for reading the scrapbook from the scrapbook storage section 122, and allowing the display section 125 to display a thumbnail and a page of the scrapbook.

Under control of the scrapbook display control section 124, the display section 125 displays the thumbnail and page of the scrapbook, and so on.

The scrapbook generation section 126 generates the scrapbook, pages of which have placed (arranged) thereon the pieces of photograph data stored in the content storage section 121, and supplies the generated scrapbook to the scrapbook storage section 122.

More specifically, the scrapbook generation section 126 requests the clustering section 127 to subject the pieces of photograph data to clustering so that the pieces of photograph data will be grouped into clusters each of which has N or less pieces of photograph data, and based on a result of the clustering performed by the clustering section 127 in response to the request, the scrapbook generation section 126 generates the scrapbook such that pieces of photograph data that belong to one cluster are arranged on one page, and supplies the generated scrapbook to the scrapbook storage section 122. Note that N is a maximum number of pieces of photograph data that can be placed on one page of the scrapbook.

To facilitate the explanation, it is assumed here that the scrapbook generated by the scrapbook generation section 126 contains the pieces of photograph data arranged on the pages of the scrapbook. Note, however, that with each of the pages of the scrapbook may be associated data IDs (e.g., file names) that identify the pieces of photograph data arranged on the page. In this case, when the scrapbook is displayed, the pieces of photograph data that are identified by the data IDs that are associated with the page can be read from the content storage section 121 and displayed.

In response to the request from the scrapbook generation section 126, the clustering section 127 subjects the pieces of photograph data stored in the content storage section 121 to the clustering, and supplies information concerning the resulting clusters, to which the pieces of photograph data stored in the content storage section 121 belong, to the scrapbook generation section 126.

Note that the content storage section 121 and the scrapbook storage section 122 as shown in FIG. 2 correspond to the HD 104 or the RAM 103 as shown in FIG. 1. The operation section 123 corresponds to the input section 106 as shown in FIG. 1, and the scrapbook display control section 124 corresponds to the CPU 101 and so on as shown in FIG. 1. The display section 125 corresponds to the output section 105 as shown in FIG. 1, and the scrapbook generation section 126 and the clustering section 127 correspond to the CPU 101 and so on as shown in FIG. 1.

In the scrapbook apparatus having the above-described structure, a scrapbook display control process and a scrapbook generation process are performed. The scrapbook display control process allows the display section 125 to display the scrapbook stored in the scrapbook storage section 122. The scrapbook generation process generates the scrapbook, the pages of which have arranged thereon the pieces of photograph data stored in the content storage section 121.

Figure 3:
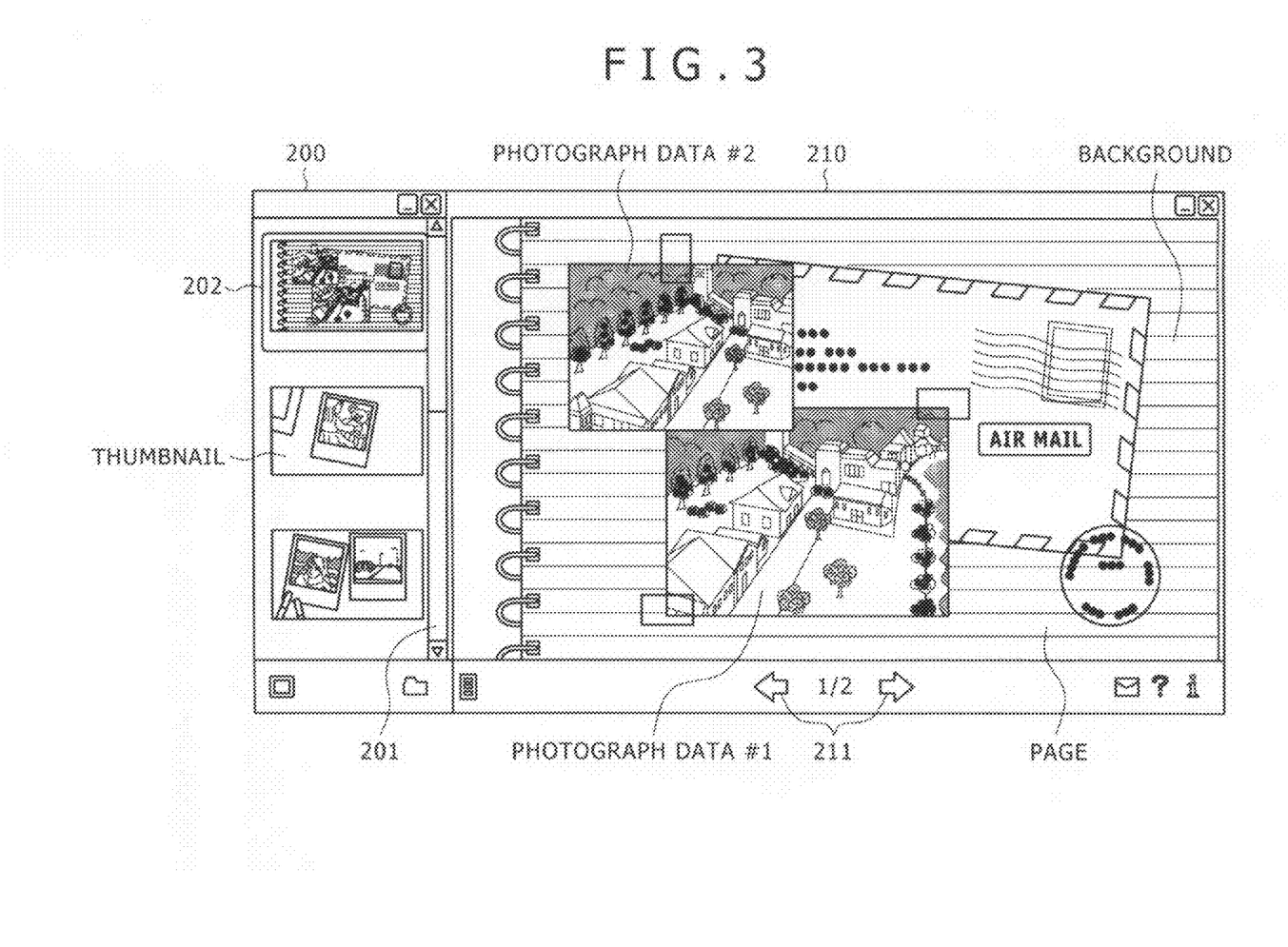
FIG. 3 shows a list screen and a scrapbook screen displayed by a scrapbook display control process.

FIG. 3 shows an exemplary screen that is displayed on the display section 125 by the scrapbook display control process.

The scrapbook display control process allows a list screen 200 and a scrapbook screen 210 to be displayed on the display section 125.

On the list screen 200, a thumbnail of a first page of each of the scrapbooks stored in the scrapbook storage section 122 is displayed, for example.

On the list screen 200 as shown in FIG. 3, the thumbnails of the first pages of the scrapbooks are arranged vertically in order of creation (generation) of the corresponding scrapbooks, for example.

In the case where the number of thumbnails is so large that all of the thumbnails cannot be displayed on the list screen 200, a maximum number of thumbnails that can be displayed on the list screen 200 are displayed thereon, while a scroll bar 201 is displayed on the list screen 200. If the user uses the operation section 123 to manipulate the scroll bar 201, the list screen 200 is scrolled so that the thumbnails being currently displayed on the list screen 200 will be replaced by other thumbnails.

In addition, a cursor 202 is displayed on the list screen 200 so as to enclose one of the thumbnails for the scrapbooks. It is assumed here that the thumbnail on which the cursor 202 is placed (i.e., enclosed by the cursor 202) is referred to as an "in-focus thumbnail". The user can use the operation section 123 to move the cursor 202, thereby switching the in-focus thumbnail.

On the scrapbook screen 210, one page of the scrapbook (hereinafter referred to as an "in-focus scrapbook" as appropriate) whose thumbnail is the in-focus thumbnail on the list screen 200 is displayed.

Page buttons 211 are provided below the scrapbook screen 210. The user can use the operation section 123 to operate any of the page buttons 211 to switch the page of the in-focus scrapbook that is displayed on the scrapbook screen 210.

On the page that is being displayed on the scrapbook screen 210 as shown in FIG. 3, two pieces of photograph data #1 and #2 are placed.

The page is capable of having a background placed thereon.

The background to be placed on the page and a layout of the page, such as the position, size, and so on of the pieces of photograph data to be placed on the page, may be determined by the scrapbook generation section 126 (see FIG. 2), and also may be specified or changed by the user by operating the operation section 123.

Next, with reference to a flowchart of FIG. 4, the scrapbook display control process performed in the scrapbook apparatus as shown in FIG. 2 will now be described below.

The scrapbook display control process is started when the user has operated the input section 106 (see FIG. 1) to issue an instruction to execute the scrapbook program, for example.

In the scrapbook display control process, at step S11, the scrapbook display control section 124 allows the display section 125 to display the list screen 200 and the scrapbook screen 210 as described above with reference to FIG. 3. Then, control proceeds to step S12.

At step S12, the scrapbook display control section 124 reads all the scrapbooks stored in the scrapbook storage section 122, and generates the thumbnail of the first page of each of the scrapbooks.

In addition, at step S12, the scrapbook display control section 124 allows the thumbnail of the first page of each of the scrapbooks stored in the scrapbook storage section 122 to be displayed on the list screen 200. Then, control proceeds to step S13.

Note that the thumbnails to be displayed on the list screen 200 may be generated in advance and stored in the scrapbook storage section 122. In this case, at step S12, the thumbnails that have previously been stored in the scrapbook storage section 122 are displayed.

At step S13, the scrapbook display control section 124 allows the cursor 202 to be displayed on the list screen 200 so as to enclose the top thumbnail (i.e., the uppermost thumbnail), for example, with the result that the scrapbook whose thumbnail is displayed at the top of the list screen 200 is determined to be the in-focus scrapbook. Then, control proceeds to step S14.

At step S14, the scrapbook display control section 124 allows the first page of the in-focus scrapbook to be displayed on the scrapbook screen 210 (see FIG. 3). Then, control proceeds to step S15.

At step S15, the scrapbook display control section 124 determines whether the in-focus scrapbook has been switched.

If it is determined at step S15 that the in-focus scrapbook has been switched, i.e., if the user has operated the operation section 123 to switch the thumbnail (i.e., the in-focus thumbnail) enclosed by the cursor 202, thereby switching the in-focus scrapbook, control returns to step S14, and the scrapbook display control section 124 allows the first page of the new in-focus scrapbook to be displayed on the scrapbook screen 210, and control proceeds to step S15 again.

Meanwhile, if it is determined at step S15 that the in-focus scrapbook has not been switched, control proceeds to step S16. At step S16, the scrapbook display control section 124 determines whether the user has performed a page turning operation, i.e., an operation on any of the page buttons 211 (see FIG. 3), using the operation section 123.

If it is determined at step S16 that the page turning operation has been performed, control proceeds to step S17. At step S17, the scrapbook display control section 124 allows a next or previous page of the in-focus scrapbook to be displayed on the scrapbook screen 210 in accordance with the page turning operation. Then, control proceeds to step S18.

Meanwhile, if it is determined at step S16 that the page turning operation has not been performed, control proceeds to step S18, skipping step S17. At step S18, the scrapbook display control section 124 determines whether the user has performed an end operation, i.e., an operation of operating the operation section 123 to end the scrapbook display control process.

If it is determined at step S18 that the end operation has not been performed, control returns to step S15, and the subsequent processes are repeated.

Meanwhile, if it is determined at step S18 that the end operation has been performed, control proceeds to step S19. At step S19, the scrapbook display control section 124 closes (dismisses) the list screen 200 and the scrapbook screen 210 being displayed on the display section 125, and the scrapbook display control process is ended.

Figure 5:
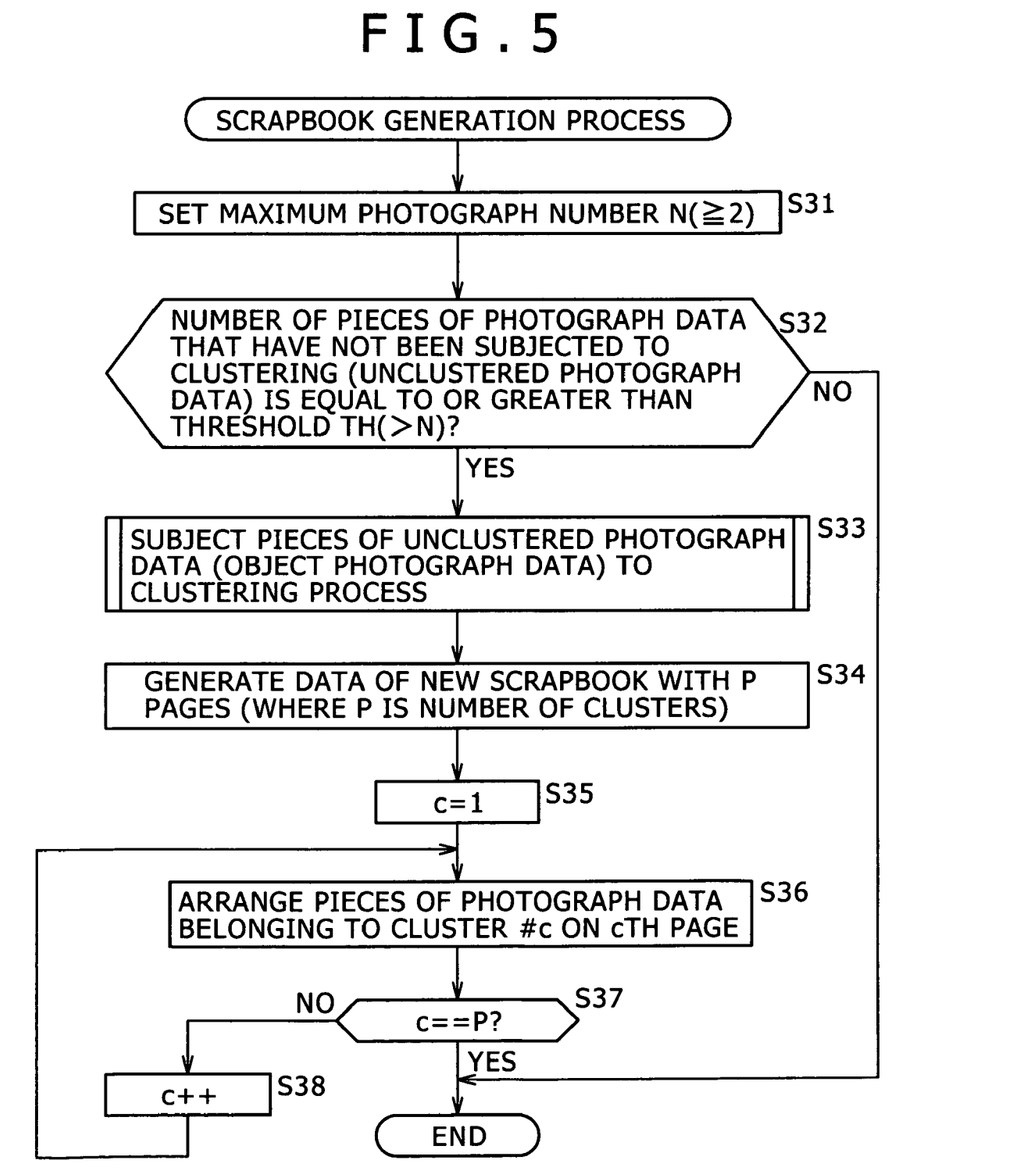
FIG. 5 is a flowchart illustrating a scrapbook generation process.

Next, with reference to a flowchart of FIG. 5, the scrapbook generation process performed in the scrapbook apparatus as shown in FIG. 2 will now be described below.

Figure 4:
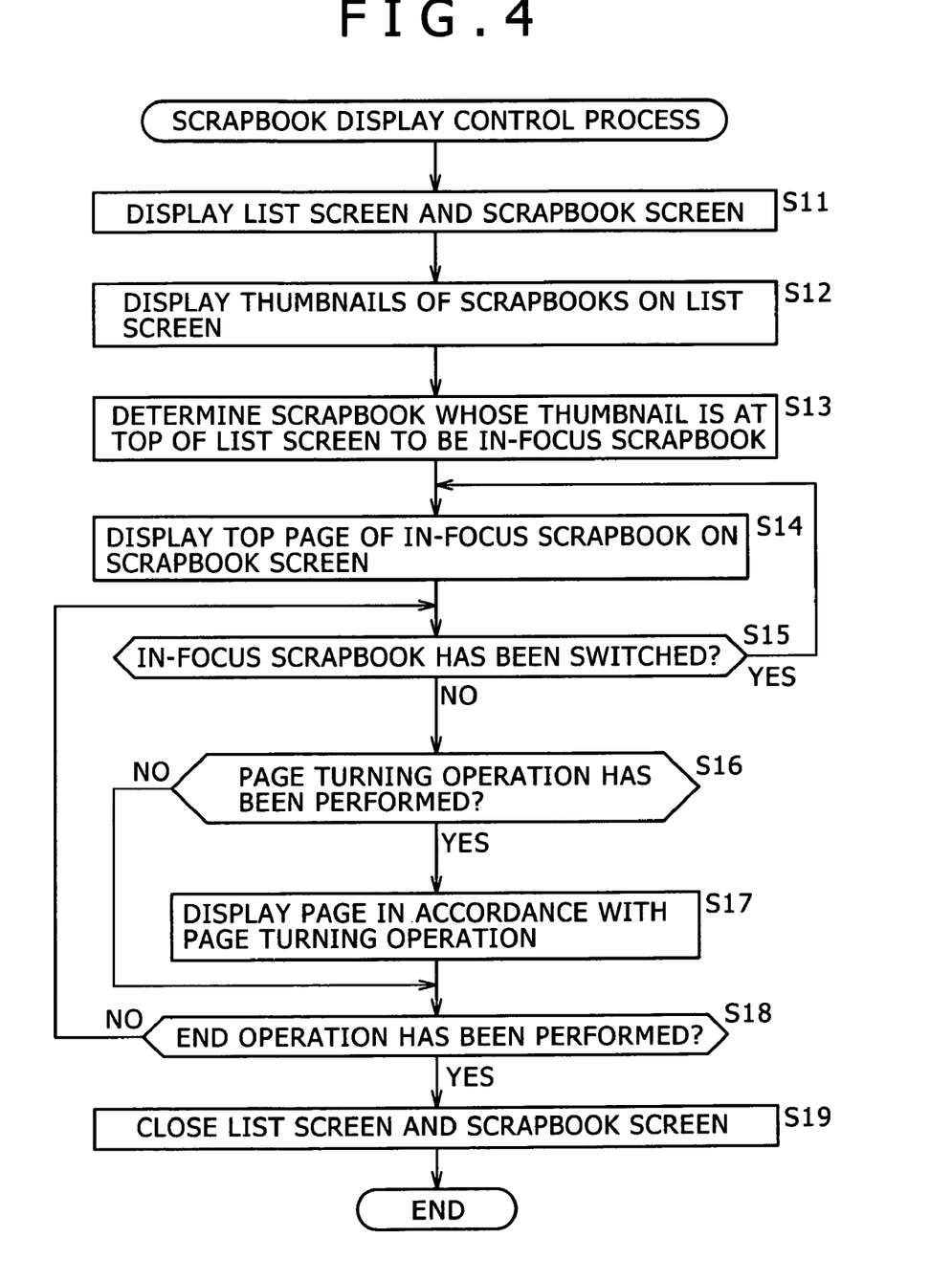
FIG. 4 is a flowchart illustrating the scrapbook display control process.

As with the scrapbook display control process as shown in FIG. 4, the scrapbook generation process is started when the user has operated the input section 106 (see FIG. 1) to issue the instruction to execute the scrapbook program, for example.

In the scrapbook generation process, at first, at step S31, the scrapbook generation section 126 sets a maximum number (i.e., a maximum photograph number) N of pieces of photograph data that can be arranged (placed) on one page of the scrapbook. Then, control proceeds to step S32.

Here, the maximum photograph number N is an integer greater than 1, and the user may specify the value of N in advance, for example. Alternatively, the maximum photograph number N may be originally set in the scrapbook program. Alternatively, the maximum photograph number N may be set to such a value that the size of the pieces of photograph data arranged on the pages of the scrapbook will be large enough for the user to see details of the photograph data to some extent, depending on the size of a screen of the display section 125 on which the scrapbook screen 210 (see FIG. 3) is displayed.

At step S32, the scrapbook generation section 126 determines whether or not the number of pieces of photograph data that have not been subjected to the clustering (hereinafter referred to as "unclustered photograph data" as appropriate), among the pieces of photograph data (i.e., contents) stored in the content storage section 121, is equal to or greater than a predetermined threshold TH, which is greater than the value of the maximum photograph number N.

Note here that, in a clustering process at step S33 described below, the clustering section 127 adds, to photograph data that has been subjected to the clustering, a flag that indicates that the photograph data has been subjected to the clustering, for example. This flag can be referred to when determining whether or not each of the pieces of photograph data stored in the content storage section 121 has been subjected to the clustering.

If it is determined at step S32 that the number of pieces of unclustered photograph data is not equal to or greater than the predetermined threshold TH, i.e., if the number of pieces of unclustered photograph data stored in the content storage section 121 is less than the predetermined threshold TH, the scrapbook generation process is finished, in order to avoid creation (generation) of a scrapbook with a few pages, e.g., only one page.

Meanwhile, if it is determined at step S32 that the number of pieces of unclustered photograph data is equal to or greater than the predetermined threshold TH, the pieces of unclustered photograph data are subjected to the clustering process, so that the pieces of unclustered photograph data are grouped into clusters each of which has N or less pieces of photograph data (where N is the maximum photograph number). Further, the scrapbook is created (generated) such that each of the pages of the scrapbook has arranged thereon pieces of photograph data that belong to a separate one of the clusters.

In other words, if it is determined at step S32 that the number of pieces of unclustered photograph data is equal to or greater than the predetermined threshold TH, the scrapbook generation section 126 requests the clustering section 127 to perform the clustering process.

In response to the request for the clustering process from the scrapbook generation section 126, control proceeds from step S32 to step S33. The clustering section 127, in response to the request from the scrapbook generation section 126, subjects the pieces of unclustered photograph data stored in the content storage section 121 to the clustering process, so that the pieces of unclustered photograph data are grouped into the clusters each of which has N or less pieces of photograph data (where N is the maximum photograph number), and supplies to the scrapbook generation section 126 information concerning the clusters into which the pieces of unclustered photograph data have been grouped. Then, control proceeds to step S34.

At step S34, based on the information concerning the clusters supplied from the clustering section 127, the scrapbook generation section 126 recognizes the total number P of clusters obtained as a result of subjecting the pieces of unclustered photograph data to the clustering, and creates a new scrapbook with P pages (where P is the total number of clusters). Then, control proceeds to step S35.

At step S35, the scrapbook generation section 126 sets a variable c for counting the number of pages to, for example, 1 as an initial value. Then, control proceeds to step S36.

At step S36, the scrapbook generation section 126 reads, from the content storage section 121, pieces of photograph data that belong to cluster #c, which is a cth cluster among the P clusters obtained as a result of the clustering process performed by the clustering section 127, and places (arranges) these pieces of photograph data on a cth page of the new scrapbook created at step S34. Then, control proceeds to step S37. Note that these pieces of photograph data are some of the pieces of unclustered photograph data that have been subjected to the clustering process at step S33.

At step S37, the scrapbook generation section 126 determines whether the variable c is equal to the total number P of clusters (i.e., the total number of pages of the scrapbook).

If it is determined at step S37 that the variable c is not equal to the total number P of clusters, i.e., if the new scrapbook created at step S34 has a page on which no photograph data is placed, control proceeds to step S38. At step S38, the scrapbook generation section 126 increments the variable c by one. Then, control returns to step S36, and the subsequent processes are repeated.

Meanwhile, if it is determined at step S37 that the variable c is equal to the total number P of clusters, i.e., if the photograph data has been placed on all the pages of the new scrapbook created at step S34, the scrapbook generation section 126 supplies the scrapbook to the scrapbook storage section 122 to be stored therein, and finishes the scrapbook generation process.

Next, with reference to a flowchart of FIG. 6, the clustering process performed by the clustering section 127 at step S33 in FIG. 5 will now be described below.

In the clustering process, the clustering section 127 handles the pieces of unclustered photograph data, among the pieces of photograph data stored in the content storage section 121, as an object of the clustering (hereinafter referred to as "object photograph data" as appropriate). The clustering section 127 recognizes a sequence of the pieces of object photograph data as arranged according to the photographing date/time (e.g., in the order in which the corresponding photographs were taken) (hereinafter referred to as an "object photograph data sequence" as appropriate) based on the photographing date/time included in the metadata stored in the content storage section 121. At step S51, the clustering section 127 reads, from the content storage section 121, the metadata of first N+1 pieces of photograph data in the object photograph data sequence (where N is the maximum photograph number) to acquire them. Then, control proceeds to step S52.

At step S52, the clustering section 127 determines whether N+1 pieces of metadata, i.e., the metadata of the first N+1 pieces of photograph data in the object photograph data sequence (where N is the maximum photograph number), have been acquired at the previous iteration of step S51.

If it is determined at step S52 that the N+1 pieces of metadata, i.e., the metadata of the first N+1 pieces of photograph data in the object photograph data sequence (where N is the maximum photograph number), have been acquired, i.e., if the number of pieces of photograph data included in the object photograph data sequence is equal to or greater than N+1, the clustering section 127 groups first N or less pieces of photograph data in the object photograph data sequence into one cluster (where N is the maximum photograph number), based on the metadata acquired at the previous iteration of step S51.

More specifically, if it is determined at step S52 that the N+1 pieces of metadata, i.e., the metadata of the first N+1 pieces of photograph data in the object photograph data sequence (where N is the maximum photograph number), have been acquired, control proceeds to step S53. At step S53, based on the (N+1 pieces of) metadata acquired at the previous iteration of step S51, the clustering section 127 calculates a distance d(n) between an nth piece of photograph data and an (n+1)th piece of photograph data (n=1, 2, ..., N), with respect to the first N+1 pieces of photograph data in the object photograph data sequence (where N is the maximum photograph number). The distance d(n) is in accordance with a predetermined distance scale.

In addition, at step S53, the clustering section 127 determines the greatest distance d(k) ($1 \leq k \leq N$) of all the distances d(n) between the nth piece of photograph data and the (n+1)th piece of photograph data with respect to the N+1 pieces of photograph data. Then, control proceeds to step S54.

Here, in the scrapbook generation process, the pieces of photograph data that belong to one cluster are placed on one page of the scrapbook as described above with reference to FIG. 5.

For example, suppose that the maximum photograph number N, i.e., the maximum number of pieces of photograph data that can be placed on one page of the scrapbook, is two, and that there are three pieces of photograph data #1, #2, and #3. Also suppose that, of the three pieces of photograph data #1 to #3, the photographing date/time and the photographing location of the piece of photograph data #2 are close to those of the piece of photograph data #3, while the photographing date/time and the photographing location of the piece of photograph data #1 are far from those of the pieces of photograph data #2 and #3. In this case, it is desirable that the pieces of photograph data #2 and #3, the photographing date/times and the photographing locations of which are close to each other, be placed on one page, on which a maximum of two pieces of photograph data can be placed. In order to achieve this, it is necessary to group the pieces of photograph data #2 and #3, the photographing date/times and the photographing locations of which are close to each other, into the same cluster.

Accordingly, in the clustering process, based on a distance according to a distance scale that measures temporal and spatial closeness (remoteness) between different pieces of photograph data (the degree of dissimilarity that indicates temporal and spatial dissimilarity between different pieces of photograph data), for example, pieces of photograph data with a relatively short distance therebetween are grouped into the same cluster.

As the distance scale that measures the temporal and spatial closeness between different pieces of photograph data #i and #j, distance scales in which the distance dis(i, j) is defined by the following equations (1) and (2), respectively, can be adopted, for example.

$$\text{dis}(i, j) = \alpha |t(i) - t(j)| + \beta(|px(i) - px(j)| + |py(i) - py(j)|) \quad (1)$$

$$\text{dis}(i, j) = \sqrt{(\alpha(t(i) - t(j))^2 + \beta((px(i) - px(j))^2 + (py(i) - py(j))^2))} \quad (2)$$

In the above equations (1) and (2), t(i) denotes the photographing date/time of the photograph data #i. In addition, px(i) and py(i) denote an x-coordinate and a y-coordinate, respectively, in a predetermined x-y coordinate system of the photographing location of the photograph data #i. As the predetermined x-y coordinate system, a two-dimensional coordinate system with a location of a house of the user or the like for the origin can be adopted, for example.

In the equations (1) and (2), $\alpha$ and $\beta$ are weighting coefficients and they are set at appropriate values.

Note that one of the weighting coefficients $\alpha$ and $\beta$ may be set at 0. For example, in the case where the weighting coefficient $\beta$ is set at 0, the distance dis(i, j) indicates a time interval (i.e., a temporal distance), (|t(i) − t(j)|), between the time at which the photograph of the photograph data #i was taken and the time at which the photograph of the photograph data #j was taken. Meanwhile, in the case where the weighting coefficient $\alpha$ is set at 0, the distance dis(i, j) indicates a spatial distance ($\sqrt{((px(i) - px(j))^2 + (py(i) - py(j))^2)}$) between the photographing location of the photograph data #i and the photographing location of the photograph data #j.

At step S54, the clustering section 127 groups first $k(\leq N)$ pieces of photograph data in the object photograph data sequence into one cluster. Then, control proceeds to step S55.

More specifically, the clustering section 127 divides the object photograph data sequence into two groups at a position where the distance d(n) according to the predetermined distance scale has the greatest value, i.e., the distance d(k), with the first group composed of the first k pieces of photograph data and the second group composed of the (k+1)th to last pieces of photograph data, and groups the first k pieces of photograph data into one cluster.

At step S55, the clustering section 127 sets the (k+1)th piece of photograph data in the object photograph data sequence as a top piece of photograph data in the object photograph data sequence. Then, control returns to step S51, and the subsequent processes are repeated.

That is, with the (k+1)th piece of photograph data in the object photograph data sequence as a new top piece of photograph data in the object photograph data sequence, the clustering section 127 determines the greatest distance d(k) of all the distances d(n) between the nth piece of photograph data and the (n+1)th piece of photograph data with respect to first N+1 pieces (reckoned from the new top piece) of photograph data in the object photograph data sequence, which is a sequence of the pieces of unclustered photograph data as arranged according to the photographing date/time based on the metadata (the number of these pieces of unclustered photograph data is equal to or greater than the threshold TH), and groups first k pieces (reckoned from the new top piece) of photograph data in the object photograph data sequence into one cluster.

If it is determined at step S52 that the N+1 pieces of metadata, i.e., the metadata of the first N+1 pieces of photograph data in the object photograph data sequence (where N is the maximum photograph number), have not been acquired at the previous iteration of step S51, i.e., if the number of pieces of photograph data included in the object photograph data sequence is less than N+1, or equal to or less than the maximum number N of pieces of photograph data that can be placed on one page, control proceeds to step S56. At step S56, the clustering section 127 determines whether the number of pieces of photograph data included in the object photograph data sequence is greater than one.

If it is determined at step S56 that the number of pieces of photograph data included in the object photograph data sequence is greater than one, control proceeds to step S57. At step S57, based on the metadata of all the pieces of photograph data included in the object photograph data sequence, the clustering section 127 calculates the distance d(n) between the nth piece of photograph data and the (n+1)th piece of photograph data, with respect to all the pieces of photograph data included in the object photograph data sequence.

In addition, at step S57, the clustering section 127 determines the greatest distance d(k) of all the distances d(n) with respect to all the pieces of photograph data in the object photograph data sequence. Then, control proceeds to step S58.

At step S58, the clustering section 127 groups the first k pieces of photograph data in the object photograph data sequence into one cluster, and groups the (k+1)th to last pieces of photograph data in the object photograph data sequence into another cluster.

Then, the clustering section 127 supplies, to the scrapbook generation section 126, information concerning the clusters obtained by the clustering at steps S54 and S58 (e.g., a set of information for identifying the clusters and information for identifying the pieces of photograph data that belong to the clusters), and control returns.

Meanwhile, if it is determined at step S56 that the number of pieces of photograph data included in the object photograph data sequence is not greater than one, i.e., if the number of pieces of photograph data included in the object photograph data sequence is one, control proceeds to step S59. At step S59, the clustering section 127 groups all pieces of photograph data included in the object photograph data sequence (in this case, only the top piece of photograph data in the object photograph data sequence) into one cluster.

Then, the clustering section 127 supplies, to the scrapbook generation section 126, information concerning the clusters obtained by the clustering at steps S54 and S59, and control returns.

Note that in the clustering process as shown in FIG. 6, the processes of steps S56 to S58 may be omitted. That is, if it is determined at step S52 that the N+1 pieces of metadata, i.e., the metadata of the first N+1 pieces of photograph data in the object photograph data sequence (where N is the maximum photograph number), have not been acquired at the previous iteration of step S51, i.e., if the number of pieces of photograph data included in the object photograph data sequence is less than N+1, or equal to or less than the maximum number N of pieces of photograph data that can be placed on one page, control may proceed to step S59, so that the clustering section 127 groups all of the N or less pieces of photograph data in the object photograph data sequence into one cluster.

Note that, at step S51, the clustering section 127 may read, from the content storage section 121, the metadata of all pieces of photograph data in the object photograph data sequence, and that after step S55, control may return to step S52.

As described above, in the clustering process, the greatest distance d(k) of all the distances d(n) (according to the predetermined distance scale) between the nth piece of photograph data and the (n+1)th piece of photograph data is determined, with respect to the first N+1 pieces of photograph data in the object photograph data sequence, which is the sequence of the pieces of unclustered photograph data as arranged according to the photographing date/time based on the metadata (the number of these pieces of unclustered photograph data is equal to or greater than the threshold TH). In the clustering process, the first k pieces of photograph data in the object photograph data sequence are grouped into one cluster, and this operation is repeated with the (k+1)th piece of photograph data in the object photograph data sequence as the new top piece of photograph data in the object photograph data sequence. Accordingly, the pieces of photograph data can be grouped into the clusters such that each of the clusters will have an appropriate number of pieces of photograph data.

In other words, it is possible to group a plurality of pieces of photograph data into clusters such that each of the clusters has N or less pieces of photograph data (where N is the maximum photograph number) with a short temporal and spatial distance therebetween.

Therefore, even in the case where a limited number of pieces of photograph data can be placed on one page of the scrapbook from the viewpoint of design or the like, it is possible within this limitation to group pieces of photograph data with a short temporal and spatial distance therebetween, i.e., pieces of photograph data which it is desirable to group together, into one cluster as a significant group.

Further, it is possible to generate a scrapbook with pages each of which has placed thereon pieces of photograph data with a short temporal and spatial distance therebetween, by placing pieces of photograph data that belong to each of the clusters on a separate page of the scrapbook.

Note that the object of the clustering is the photograph data in the present embodiment. However, the object of the clustering may be other types of contents, including video contents such as television broadcasts or films, video or still image contents obtained by photographing with a video camera, and music contents.

Also note that, in the present embodiment, all pieces of photograph data that have not been subjected to the clustering (i.e., unclustered photograph data) are subjected to the clustering in the clustering process (see FIG. 6). However, the user may specify, by operating the input section 106, the pieces of photograph data that should be subjected to the clustering, for example.

Also note that, in the present embodiment, the scrapbook generation process (see FIG. 5) is started when the user has operated the input section 106 (see FIG. 1) to issue the instruction to execute the scrapbook program. However, the scrapbook generation process may alternatively be performed periodically or when the user has issued an instruction to perform the scrapbook generation process, for example.

As described above, the present invention is applicable to the PC. Note, however, that the present invention is also applicable to other types of devices that have a capability to store (accumulate) the contents, such as a hard disk recorder, the digital still camera, the digital video camera, and an audio player.

Note that the processing steps of the program for causing the computer to perform the various processes as described above in the present specification do not need to be performed chronologically in the order as indicated in the above-described flowcharts. Some of the steps may be performed in parallel or independently of one another. For example, some of the steps may be implemented by parallel processing or object processing.

Also note that the program may be processed either by a single computer or by a plurality of computers in a distributed manner.

Also note that the present invention is not limited to the above-described embodiment. It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for grouping a plurality of contents into clusters, the apparatus comprising:
an acquisition portion configured to acquire metadata of each of the plurality of contents; and
a clustering portion configured to group the plurality of contents into the clusters based on the metadata, such that each of the clusters has N or less contents, N being a predetermined number, wherein
said clustering portion
calculates a distance d(n) according to a predetermined distance scale between an nth content and an (n+1)th content with respect to first N+1 contents in a content sequence, and determines a greatest distance d(k) of all the distances d(n), the content sequence being a sequence of the plurality of contents as arranged according to a predetermined standard based on the metadata,
groups first k contents in the content sequence into one cluster, and
with a (k+1)th content in the content sequence as a new top content in the content sequence, repeats the determining of the greatest distance d(k) and the grouping of the first k contents in the content sequence into one cluster.

2. The information processing apparatus according to claim 1, wherein
each of the contents is image data of an image taken with a photographing device,
the metadata includes a photographing date/time and a photographing location of the image data,
the content sequence is a sequence of the pieces of image data as arranged according to the photographing date/time, and
as the distance d(n) according to the predetermined distance scale, said clustering portion calculates a time interval between the photographing date/time of the nth content and the photographing date/time of the (n+1)th content or a distance between the photographing location of the nth content and the photographing location of the (n+1)th content.

3. The information processing apparatus according to claim 1, further comprising:
a scrapbook generation portion configured to generate a scrapbook with pages each of which has arranged thereon the contents belonging to a separate one of the clusters, the scrapbook being an electronic album.

4. The information processing apparatus according to claim 3, wherein the predetermined number N is a maximum number of contents that can be arranged on one page of the scrapbook.

5. The information processing apparatus according to claim 3, further comprising:
a scrapbook display control portion configured to allow the scrapbook to be displayed.

6. An information processing method for grouping a plurality of contents into clusters, the method comprising the steps of:
acquiring metadata of each of the plurality of contents; and
grouping the plurality of contents into the clusters based on the metadata, such that each of the clusters has N or less contents, N being a predetermined number, wherein
said grouping step includes
calculating a distance d(n) according to a predetermined distance scale between an nth content and an (n+1)th content with respect to first N+1 contents in a content sequence, and determining a greatest distance d(k) of all the distances d(n), the content sequence being a sequence of the plurality of contents as arranged according to a predetermined standard based on the metadata,
grouping first k contents in the content sequence into one cluster, and
with a (k+1)th content in the content sequence as a new top content in the content sequence, repeating the determining of the greatest distance d(k) and the grouping of the first k contents in the content sequence into one cluster.

7. A storage media having recorded thereon a program for causing a computer to function as an information processing apparatus for grouping a plurality of contents into clusters, the program causing the computer to function as:
an acquisition portion configured to acquire metadata of each of the plurality of contents; and
a clustering portion configured to group the plurality of contents into the clusters based on the metadata, such that each of the clusters has N or less contents, N being a predetermined number, wherein
said clustering portion
calculates a distance d(n) according to a predetermined distance scale between an nth content and an (n+1) th content with respect to first N+1 contents in a content sequence, and determines a greatest distance d(k) of all the distances d(n), the content sequence being a sequence of the plurality of contents as arranged according to a predetermined standard based on the metadata,
groups first k contents in the content sequence into one cluster, and
with a (k+1) th content in the content sequence as a new top content in the content sequence, repeats the determining of the greatest distance d(k) and the grouping of the first k contents in the content sequence into one cluster.

* * * * *